United States Patent Office 3,079,333
Patented Feb. 26, 1963

3,079,333
GEL-FORMING ATTAPULGITE CLAY AND
METHOD FOR PREPARING SAME
Thomas S. Malone, Bainbridge, Ga., and Aldo P.
Allegrini, Westfield, N.J., assignors to Minerals &
Chemicals Philipp Corporation, Menlo Park, N.J., a
corporation of Maryland
No Drawing. Filed Jan. 11, 1960, Ser. No. 1,434
5 Claims. (Cl. 252—8.5)

The present invention relates to the treatment of attapulgite clay to improve its properties when dispersed in water to form aqueous gels, such as in the preparation of drilling muds.

Attapulgite is the predominating mineral species in fuller's earth of the Georgia-Florida variety. The mineral is a hydrated magnesium aluminum silicate of colloidally dimensioned acicular ultimate particles. A typical analysis of Georgia-Florida fuller's earth, on a volatile free basis, is as follows:

| | Percent by weight |
|---|---|
| $SiO_2$ | 67.0 |
| $Al_2O_3$ | 12.5 |
| $Fe_2O_3$ | 4.0 |
| CaO | 2.5 |
| MgO | 11.0 |
| Others | 3.0 |
| | 100.0 |

As mined, Georgia-Florida fuller's earth consists of moist packets of aggregated needles, usually together with small quantities of impurities such as quartz, other clay minerals and iron minerals. The free moisture content of the raw clay as mined is typically about 38%, and the volatile matter content is usually about 48%. The term "free moisture" (F.M.) as used herein refers to the weight percentage of clay eliminated by heating the clay essentially to constant weight at 220° F. The term "volatile matter" (V.M.) refers to the weight percentage of clay eliminated by heating the clay essentially to constant weight at 1800° F. Many properties of the clay and its uses are correlated with the nature and quantity of water associated therewith. Colloidal grades of attapulgite clay have a volatile matter content of about 10% or more and contain sufficient water of hydration and physically held water to disperse in water into colloidally dimensioned particles with the resultant formation of a viscous system. Suspensions of colloidal attapulgite particles are used in preparing drilling muds and aqueous gels for suspending particulate matter such as insoluble insecticides. Unlike suspensions of other colloidal clays which flocculate in the presence of electrolytes such as salt, a suspension of a small quantity of attapulgite in salt water, or solutions of other electrolytes, provides a stable viscous system. This phenomenon has led to the extensive use of attapulgite clay in drilling mud applications where formations of salt and anhydrite, for example, are encountered. For most of its principal applications, as in drilling mud use, the clay is supplied in finely divided form since coarse lumps or granules are difficult to handle in the pumps used to prepare the desired colloidal aqueous dispersions of the clay. The clay is dried to a V.M. usually less than 30% to avoid the cost of shipping a wet material.

In the production of drilling mud clay of the attapulgite type it is common practice to crush the raw clay to a size not greater than about one-quarter inch in thickness, add water sufficient to provide a mixture of extrudable consistency, typically 50% to 60% V.M., extrude the pugged mixture under pressure in an auger type extruder through a die plate and dry the extrudate to a V.M. of about 20% to 25%. The clay is then ground to a fineness such that usually about 50% to 75% or more by weight of the particles are passable through a 325 mesh (U.S. standard) sieve. The resultant powder is then dispersed in water or brine and special purpose additives incorporated. For example fluid loss of attapulgite mud may be controlled by addition to the aqueous clay dispersion of organic fluid-loss reducing agents such as starch, sodium carboxymethyl cellulose, ferro chrome lignosulfonate and quebracho or combinations thereof.

In the rotary drilling of wells, a drilling mud is introduced to remove the cuttings, cool the bit and seal formations. The mud must be sufficiently viscous to carry the cuttings and to suspend the finely divided weighting mediums (e.g., barytes) which are ordinarily used. In recent years it has been established that a low weight-low solids mud provides faster bit penetration rates. In view of this, drilling muds are preferably made up using clays which yield the highest viscosity per unit of clay in the mud. Moreover, the clay used must tolerate contamination with electrolytes without loss of the viscosity required to remove bit cutting from the well bore.

The mud-making qualities of a clay are indicated by certain properties of an aqueous suspension of the clay. Among the most important of these properties is the yield of the clay, the term "yield" being defined as the number of barrels of mud having an apparent viscosity of 15 cp. (as determined on a Stormer-type viscometer) that can be made from one ton of clay. In the case of salt water muds, the yield of the clay in a saturated sodium chloride solution is conventionally determined, and such value is indicative of the performance of the mud in its intended application. The API procedure for determining mud yield is set forth in API RP 29, Standard Field Procedure for Testing Drilling Fluid, fourth edition, Section A–II, A25–A30 (May 1957). A typical API yield of attapulgite drilling clays presently commercially available is 125 bbl./ton in saturated salt water and 150 bbl./ton in fresh water. Obviously, an improvement in API mud yield of attapulgite clay, especially salt water yield, in which application attapulgite is of particular value, would improve the economics of attapulgite drilling muds. An improvement in yield of the order of only 5 or 10 barrels per ton represents a substantial economic benefit.

Accordingly, a principal object of the invention is the provision of a method of treating attapulgite clay so as to enhance the gel-forming properties of the clay.

An important and more particular object of the subject invention is the provision of an attapulgite clay product which is characterized by producing a higher mud yield, particularly salt water mud yield, than attapulgite clay heretofore available.

Further objects and advantages will be readily apparent from a description of the invention which follows.

The subject invention is the result of the discovery that the gel-forming properties of attapulgite clay in aqueous media may be enhanced materially by drying and grinding the raw clay in a novel manner hereafter set forth.

Broadly stated, the method of treating attapulgite clay comprises the step of rapidly drying moist raw attapulgite clay masses to eliminate therefrom some, but not all, of the loosely held free moisture, without eliminating water of hydration by conveying masses of the moist clay in a stream of hot, high velocity moisture-adsorptive gases while simultaneously disintegrating said masses into particles such that substantially all are finer than 48 mesh, and the quantity of particles finer than 325 mesh is limited.

In accordance with a preferred embodiment of the invention the raw clay masses fed to the dryer are extruded masses in which case a product of exceptional gel-forming capacity is produced and attapulgite clay drilling muds of heretofore unattainable yields are realized.

An aqueous dispersion of attapulgite clay processed in accordance with the method of this invention has a higher API mud yield (fresh and salt water) than commercial drilling mud clay of the attapulgite type which has been dried in conventional dryers, such as the usual rotary dryers, and then ground to the desired particle size. Even prolonged agitation of a similar concentration of prior art drilling mud grades of attapulgite clay will not produce a system having the high viscosity which is obtained upon prolonged agitation in aqueous media of our improved attapulgite clay. The mud yield of our clay will vary with the quality of the raw clay employed, and some clay deposits will provide a starting clay more suitable than other deposits. By way of comparison, whereas a good grade of attapulgite clay treated by conventional methods has a maximum salt water yield of about 125 to 135 barrels per ton and fresh water yield of about 150 barrels per ton, calculated on a 20% V.M. clay basis, attapulgite produced in accordance with this invention may possess a salt water yield of 150 or 200 and higher (20% V.M. clay basis) and a fresh water yield somewhat higher than its salt water yield.

More specifically, in accordance with a preferred embodiment of this invention, the improved inorganic gellant is prepared by adding water to crushed raw attapulgite clay in amount sufficient to raise the V.M. content of the mixture to an extrudable consistency, after which the mixture is pugged or otherwise mixed to obtain an apparently homogeneous mixture. Mixtures having a V.M. as low as about 50% and as high as about 70% V.M. may be extruded, although mixtures of about 55% to 65% V.M. are better suited for extrusion. Following the pugging step, the mixture is extruded under pressure, such as 100 to 500 p.s.i., by means of any commercial extruder. The primary purpose of extrusion is to improve the mud yield of the clay over the mud yield of unextruded clay, this being accepted procedure in the processing of attapulgite clay for use in drilling muds and is described in U.S. Patent No. 2,231,328 to Fitzsimons. The mixture is extruded through a die plate into ribbons or strands which are typically ¼-inch to ½-inch in diameter. The extruded pieces are then cut into pellets usually ¼-inch to ½-inch long. The V.M. of the freshly extruded pellets is usually somewhat less than the V.M. of the feed to the extruder.

If desired, the extrusion step may be omitted and moist pieces of raw clay having a V.M. of about 30% to about 70% treated in accordance with steps hereafter set forth. In this case, the gel-forming properties of the ultimate product will represent a substantial improvement over that of unextruded clay which has been dried to equivalent V.M. and ground to like particle size is accordance with conventional drying and milling procedures.

The moist feed material (extruded or not extruded, as desired) is then subjected to rapid drying by direct contact with high velocity, hot dry gases simultaneously while grinding or pulverizing the particles so that drying takes place while fine particles are suspended in a gas which is circulating at high velocity in the dryer. The moist feed is dropped into a stream of hot dry gas and the gas stream carries the feed to suitable mill and the dried fine particles to a cyclone for collection. Outstanding results have been realized utilizing an Imp mill (a product of Raymond Division, Combustion Engineering, Inc.), provided with means to circulate hot air at high velocity through the feed material. In the Imp mill, hammers are pivotally mounted to arms which are provided (pivotally if desired) on a shaft adapted to rotate at high speed. The principal action of such a mill is one of impact rather than the compression which takes place in roller type mills. Fracture of the feed is also effected in the Imp mill by the rubbing of clay particles against each other in the rapidly moving gaseous suspension of the particles. Hammer mills of this or similar design are available with means for internal classification within the mill. A principal advantage of conducting the simultaneous drying and disintegration operation in a hammer type mill is that such a mill is able to pulverize relatively wet plastic feed, whereas available roller mills which disintegrate by compression can operate only on relatively dry feed, e.g., attapulgite clay having a V.M. of 40% or less. Another disintegrator which can operate on relatively moist feed is a cage mill which has rotors concentric with each other and successive rotors are adapted to operate in opposite directions; in such a mill feed is beaten by the action of bars on rings of the rotors. Other types of dry grinding mills, provided with means for rapid positive circulation of drying gases, may be used when they are available.

In the rapid drying-pulverization step the feed is reduced to a V.M. of about 17% to about 32%, and preferably about 20% to 26%. Drying the product to a V.M. higher than about 26% is undesirable because of the adverse economics of transporting such a moist material, whereas loss in yield usually occurs if the material is dried to a V.M. less than about 20%. The loss in yield is very marked if the material is dried to a V.M. less than about 17%.

The size reduction in the mill is controlled so that the product is substantially all finer than about 48 mesh since coarser products are difficult to handle in the field, and the amount of material finer than 325 mesh is limited to not more than about 50% by weight. It has been found, contrary to expectation, that mud yield is reduced by the presence of substantial quantities of very fine particles, viz., particles finer than about 325 mesh. This phenomenon is not presently fully understood, although it is believed that ultrafine particles are adversely and permanently affected during their formation in the grinding cycle. Preferably, the quantity of rapidly dried particles in the product which is finer than 325 mesh does not exceed 30% by weight. More preferably, none of the particles in the product is finer than 325 mesh. Particularly outstanding results may be expected when processing is controlled to limit also the 100/325 mesh particles to the lowest possible value, as close to 0% as is possible. Thus, the mud yield of a 48/100 mesh product will be superior to a minus 48 mesh product which contains substantial quantities of minus 100 mesh material, all other factors being the same. The fine particles may be removed from the more desirable relatively coarse particles by screening the rapidly dried product to eliminate fines. Preferably, the desired classification is realized directly by controlling the operation of the rapid dryer-grinding unit to curtail the production of the undesirable fines.

As used herein, mesh size refers to sieve sizes determined by screening on U.S. standard sieves. The term "minus" designates material that will pass through a sieve and, in like manner, the term "plus" designates material that will be retained on a particular size sieve. The term "48/100 mesh" designates material which will pass completely through the 48 mesh sieve but is retained completely on a 100 mesh sieve.

As mentioned, an important feature of the process of the invention is that rapid drying is effected by the action of hot, high velocity moisture-absorptive gases so that drying takes place while particles are gas suspended. These gases may have velocities of the order of about 50 to 70 feet per second or higher, and inlet temperatures within the range of about 225° F. to about 900° F. or somewhat higher. The residence period of the feed within the dryer will depend of course on numerous factors including the mill capacity, gas velocity and temperature and drying efficiently but is of very short duration, such as 2 to 30 seconds, and usually 2 to 4 seconds. Inasmuch as drying is extremely rapid, the clay particles do not attain the temperature of the drying gas, and the product temperature in the dryer is well below that at which water of hydration is removed from the clay lattice, i.e., below about 350° F. and usually from about 100° F. to 200° F.

The gases may be direct or indirect combustion products, the only limitation being they have the capacity to absorb moisture from the feed and are inert towards the clay. Dry air is eminently suitable.

The mill is preferably provided with classifier means to remove sand which usually accounts for about 5% of the volatile free weight of clay feed. The presence of sand in the ultimate product will account for a loss of mud yield inasmuch as the sand does not contribute to the mud-making properties.

In many instances the addition of small quantities of dried product to the feed to the mill will prevent the feed from sticking to the grinding equipment.

The ground product may be separated from the drying gases in which they are suspended by a cyclone or other suitable device and the gases, after reheating if desired, recirculated through the mill.

If available mills are of the roller or other types which cannot handle relatively wet feed (such as an extrudate having a V.M. of about 40% or more), the feed, before being rapidly dried to the desired product V.M., may be subjected to an intermediate partial drying step in any suitable dryer, which may be of the static bed variety in which air circulation rate is low. Drying in static bed may be conducted within a wide range of temperatures, 275° F. up to 1600° F. or higher, depending on the time, but must never be so extensive that the V.M. of the feed is reduced below about 30% since static bed drying of feed below this V.M. manifests itself in an ultimate product of reduced mud yield. Static bed drying at 225° F. to about 600° F. may take about ¼ to 1 hour, whereas static bed drying at 1600° F. will require a residence period of seconds.

It has been found, however, that optimum results are realized when a substantial reduction in V.M. takes place during the rapid drying step. In this connection, it has been found that a much higher mud yield is realized when the V.M. of the feed is reduced by 40% of its original V.M. in an Imp mill provided with high velocity hot air than when the V.M. of feed which has been initially partially dried in a static bed dryer is reduced only about 15% to 20% under comparable conditions in the Imp mill.

In preparing aqueous suspension of the colloidal attapulgite produced as described herein, from about 1% to 20%, and usually about 5% to 10%, will be used, depending on the viscosity desired. When the raw clay has been extruded under pressure prior to rapid drying and grinding, ordinary low shear mixing equipment, such as a paddle-type agitator or a gear pump mixer, will suffice to produce the desired thickened suspension. High shear mixing equipment, such as a colloid mill or 3-roll paint mill, will be used if extrusion has been omitted.

Following are examples which illustrate the superiority of attapulgite clay processed in accordance with the present invention over attapulgite clay heretofore known and over attapulgite which has been merely rapidly dried with no forced or induced air circulation and without simultaneous pulverization.

In the examples, the salt water mud yields were obtained utilizing saturated sodium chloride solutions in accordance with the API method described above. Also reported are fresh water yields obtained utilizing distilled water. In many instances, results are reported on "as is" basis and converted to a 20% V.M. basis to facilitate comparison.

In the testing of yield, clay was added to 350 cc. of a saturated salt solution (or distilled water), stirred for 20 minutes, aged for 24 hours, restirred for 5 minutes and evaluated.

EXAMPLE I

This example illustrates the preparation of drilling mud grades of attapulgite clay by conventional procedure, viz., drying an extrudate of the raw clay in a static bed dryer to a suitable V.M. followed by milling to an appropriate particle size in a Raymond mill of the roller type.

An extrudate was initially prepared by pugging crushed raw Georgia-Florida fuller's earth (clay A) with water to a V.M. of 60% and extruding the pugged mixture in an auger extruder through a ½-inch land. Pellets approximately ¼-inch to ½-inch long were cut from the extrudate. This procedure was repeated using attapulgite clay from another deposit (clay B).

The extruded pellets having a V.M. of 58% were dried in a rotary externally fired dryer to V.M. values reported in Table I. The temperature in the dryer was about 250° F. to 300° F., and pellet retention time in the dryer was about an hour. The dried pellets were fed to a Raymond roller mill provided with a classifier to remove sand and were milled to fineness such that 100% by weight was minus 48 mesh. The properties of the ground products including their mud yields are reported in Table I.

*Table I*

PROPERTIES OF ROTARY DRIED AND ROLLER MILLED ATTAPULGITE CLAY

|  | Clay A | Clay B |
| --- | --- | --- |
| V.M., Percent Mesh Size | 21.4 | 26.2 |
| +60 | 8.0 | 0 |
| 60/80 | 8.6 | 0.8 |
| 80/100 | 7.5 | 0.8 |
| 100/200 | 23.0 | 18.4 |
| 200/325 | 26.0 | 29.2 |
| −325 | 26.9 | 50.8 |
| Drilling Mud Yield, Bbl./ton: | | |
| "As Is" Basis— | | |
| Salt Water | 125 | 133 |
| Fresh Water | 150 | |
| 20% V.M. Basis— | | |
| Salt Water | 127 | 144 |
| Fresh Water | 153 | |

The yields of these products are representative of those of better grades of commercial attapulgite drilling mud clays. It will be noted that if sand removal was omitted, as in the subsequent examples, the reported yields would each be reduced by about 5 barrels per ton. Thus, the salt water yield (20% V.M. basis) of clay A would be about 122 barrels per ton, if no sand was removed.

EXAMPLE II

IIa. This example illustrates the exceptional improvement in salt water mud yield which is realized by rapidly drying moist attapulgite simultaneously while disintegrating the material into relatively coarse particles.

In this example the drying and disintegration was accomplished in an Imp mill provided with means to circulate hot air at high velocity through the mill and a cyclone separator.

Extrudate was fed to the Imp mill provided with high velocity hot air at inlet temperature varying from 490° F.

to 800° F. Air circulation rate was approximately 5000 feet per minute.

The results of various runs made in the Imp mill unit together with specific conditions employed are reported in Table II.

Table II

PROPERTIES OF RAPIDLY DRIED ATTAPULGITE CLAY WHICH WAS SIMULTANEOUSLY GROUND IN IMP MILL

|  | Clay A | | Clay B | |
| --- | --- | --- | --- | --- |
| Run Number | I | IA | II | IIA |
| Air Inlet Temperature, ° F | 500 | 500 | 750–800 | 650 |
| Product Temperature, ° F | 139 | 136 | 160 | 148 |
| V.M. of Product, percent | 20.4 | 26.2 | 18.5 | 21.8 |
| Mesh Size of Product: | | | | |
| +60 | 0 | 0 | 11.0 | 6.2 |
| 60/80 | 8.4 | 12.0 | 11.2 | 5.1 |
| 80/100 | 6.6 | 8.8 | 8.6 | 3.8 |
| 100/200 | 5.8 | 8.0 | 31.6 | 21.0 |
| 200/325 | 23.0 | 29.0 | 19.2 | 20.1 |
| −325 | 26.2 | 22.2 | 18.4 | 43.8 |
| Drilling Mud Yield, Bbl./ton: | | | | |
| "As Is" Basis— | | | | |
| Salt Water | 165 | 158 | 204 | 183 |
| Fresh Water | 172 | 168 | 239 | 211 |
| 20% V.M. Basis— | | | | |
| Salt Water | 166 | 171 | 199 | 188 |
| Fresh Water | 173 | 182 | 237 | 216 |

The results demonstrate the outstanding improvement in mud yield that is realized by practice of the method of the invention. Clay A, processed in accordance with the prior art teachings, had a salt water mud yield (20% V.M. basis) of 127; the same clay without desanding provided products having salt water yields (20% V.M. basis) of 166 and 171 when processed in accordance with the method of the present invention, representing about a 33⅓% improvement over the prior art desanded clay. The improvement in salt water yield of clay B was equally spectacular. Thus, the 20% V.M. basis salt water yield was increased from 144 barrels per ton up to 199 and 188 barrels per ton (all 20% V.M. basis), a 38% and 30.5% improvement, respectively.

II*b*. When clay B was processed in the Imp mill under the same conditions as employed in run IIA but processing was modified to produce a much finer product than obtained in run IIA, the "as is" mud yield (salt water) of the product was only 134. This yield was appreciably less than that obtained in runs II and IIA (204 and 183, respectively). The particle size distribution of the very fine product which had a mud yield of only 134 is as follows: 48/100 mesh, 0.7% by weight; 100/200 mesh, 2.0%; 200/325 mesh, 9.0%; minus 325 mesh, 88.4%.

This result shows that optimum effects of rapidly drying simultaneously with grinding is realized only when grinding is controlled to provide a product having relatively small content of very fine material.

EXAMPLE III

This example illustrates the improvement in mud yield which results even when the extrudate is mildly dried under static conditions prior to rapid drying simultaneously with disintegration in accordance with the method of the invention. The initial static bed drying step was included in the process because the roller mill employed in a subsequent processing step could not pulverize the extrudate which had a V.M. of 58%.

The extrudate of clay A prepared in Example I (V.M. 58%) was dried in an externally fired rotary dryer to 37% V.M. The partially dried extrudate was then rapidly dried and simultaneously pulverized in a Raymond mill (roller type) through which hot dry air was circulated at high velocity. The partially dried extruded product was dried in the unit to the V.M. content and particle size distribution reported in Table III. The drying conditions, properties of the dried material and corresponding salt water mud yields, are tabulated below in Table III.

Table III

EFFECT OF PARTIAL DRYING OF ATTAPULGITE CLAY IN STATIC BED FOLLOWED BY RAPID DRYING AT HIGH AIR CIRCULATION RATES SIMULTANEOUSLY WITH GRINDING

| | |
| --- | --- |
| V.M. of feed to rapid dryer, percent | 37.0 |
| V.M. of rapid dryer product, percent | 20.4 |
| Inlet of temp. of air in rapid dryer ° F | 375 |
| Mesh size of product: | |
| +80 | 16.2 |
| 80/100 | 8.2 |
| 100/200 | 26.8 |
| 200/325 | 16.2 |
| −325 | 32.6 |
| Drilling mud yield, Bbl./ton: | |
| "As is" basis— | |
| Salt water | 145 |
| 20% V.M. basis— | |
| Salt water | 146 |

The results show that clay A, which had a salt water yield (20% V.M. basis) of 130 when processed by conventional procedure including desanding, had a salt water yield (20% V.M. basis) of 146, over a 10% improvement, when processed in accordance with a form of the present invention.

EXAMPLE IV

This example illustrates that the combination of rapid drying with simultaneous pulverization, rather than rapid drying per se, is essential to produce the attapulgite of the desired gel-forming properties. To illustrate the point, runs were made in which small particles of a moist extrudate of clay B were rapidly dried to a V.M. less than 26% in thin static beds at low air circulation rate under various conditions of time and temperature.

The detailed report of drying conditions and corresponding mud yields are tabulated below.

Table IV

EFFECT OF RAPID DRYING OF ATTAPULGITE CLAY IN STATIC BEDS AT LOW AIR CIRCULATION RATES

| Dryer Feed | Furnace Atmosphere Temp., ° F. | Time | V.M., Percent | Drilling Mud Yields, Bbl./ton Salt Water | |
| --- | --- | --- | --- | --- | --- |
| | | | | "As Is" | 20% V.M. Basis |
| ⁵⁄₁₆″ x ½″ | 1,750 | 1.5 min | 20.6 | 103 | 104 |
| −6 Mesh Granules. | 560 | 4.0 min | 23.0 | 130 | 135 |
| Do | 1,350–1,580 | 20.0 sec | 27.0 | 124 | 136 |
| Slabs ¹⁄₁₆″ Thick. | 140 | 100.0 min | 20.9 | 136 | 137 |
| Do | 1,050 | 30.0 sec | 26.2 | 123 | 134 |
| Do | 1,570 | 10.0 sec | 29.5 | 118 | 134 |
| Do | 1,750 | 5.0 sec | 30.6 | 118 | 136 |

The results show that products dried in thin static beds with no forced or induced air circulation failed to produce the high yields which were obtained when drying and pulverizing occurred simultaneously in a unit with positive air circulation.

The effects of drying an attapulgite extrudate (clay B) to the highest V.M. where it could be pulverized to minus 60 mesh followed by rapid drying in a static bed were also investigated to determine whether rapid drying of small particles per se was responsible for the improved mud yields.

Table V

EFFECT OF PARTIAL DRYING OF ATTAPULGITE EXTRUDATE FOLLOWED BY PULVERIZING TO −60 MESH AND STATIC BED DRYING

| First Step | Second Step | | | | |
|---|---|---|---|---|---|
| | Temp., °F. | Time | V.M., Percent | Drilling Mud Yield, Salt Water, Bbl/Ton | |
| | | | | "As Is" | 20% V.M. |
| −4 mesh extruded clay dried to 39-42% V.M. in rotary burner at 220-230° F. in 20-28 min., then ground to −60 mesh. | 300 | 2 min | 24.6 | 128 | 136 |
| | 1700 | 15 sec | 29.8 | 123 | 140 |
| | 1800 | 5 sec | 30.0 | 123 | 140 |

The results of these experiments, when compared with those of Examples II and III, show that the desired results are not obtained unless grinding accompanies rapid drying.

It has been shown that the method of the present invention permits the production of a colloidal grade of attapulgite which has a salt water and fresh water mud yield which is increased at least about 10% over the yield of extruded clay dried and pulverized in accordance with prior art procedure. It has also been shown that the extent of the improvement varies with the raw clay employed as well as the moisture content of the feed in the rapid drying-pulverization step.

It will be understood that the dry attapulgite product produced in accordance with the present invention is useful also in fresh water drilling muds although it is particularly advantageous in salt water or gyp muds. Obviously, drilling muds prepared with the improved clay may include conventional mud additives as indicated, such as for example, water loss reducing agents, gel-strength inhibitors, etc.

Although the invention has been described with particular reference to its applicability to the provision of improved drilling muds, it will be understood that the improved dry attapulgite product of the invention will have enhanced value in all those fields in which the ability of attapulgite to form a thickened system in aqueous media is of importance.

While preferred embodiments of the invention have been described, it is to be understood that minor changes may be made in the details of preparation of the attapulgite product without departing from the spirit and scope of the invention as defined by the appended claims.

We claim:

1. A method of treating attapulgite clay to improve its gel-forming properties which comprises rapidly drying moist masses of attapulgite clay to a V.M. of about 17% to about 32% by suspending said masses in high velocity moisture absorptive gases at a temperature of from about 225° F. to about 900° F. while simultaneously pulverizing said masses to a fineness such that substantially all particles are finer than 48 mesh and not more than about 50% by weight are finer than 325 mesh.

2. A method of treating attapulgite clay to improve its gel-forming properties which comprises extruding moist attapulgite clay under pressure and rapidly drying the moist extrudate of attapulgite clay to a V.M. of about 17% to about 32% by suspending said extrudate in moisture absorptive gases circulating at high velocity at a temperature from about 225° F. to about 900° F. while simultaneously pulverizing said masses to a fineness such that substantially all particles are finer than 48 mesh and not more than about 50% by weight are finer than 325 mesh.

3. A method of treating attapulgite clay to improve its gel-forming properties which comprises extruding moist attapulgite clay under pressure and drying the moist extrudate to a V.M. content within the range of from about 20% to about 26% by suspending a moist extrudate of said clay in a stream of high velocity moisture absorptive gases at a temperature of from about 225° F. to about 900° F. while simultaneously pulverizing said extrudate to a fineness such that substantially all particles are finer than 48 mesh and not more than about 50% by weight are finer than 325 mesh.

4. A method of treating attapulgite clay to improve its gel-forming properties which comprises extruding moist attapulgite clay under pressure and drying the extrudate of attapulgite clay from a V.M. content of from about 30% to about 70% to a V.M. content within the range of from about 20% to about 26% by suspending the extrudate in a stream of moisture absorptive gases circulating at high velocity for about 2 to 4 seconds at a temperature from about 225° F. to about 900° F. while simultaneously pulverizing said masses to a fineness such that substantially all particles are finer than 48 mesh and not more about 50% by weight are finer than 325 mesh.

5. A method of treating attapulgite clay to improve its gel-forming properties which comprises extruding moist attapulgite clay under pressure and drying the extrudate from a V.M. content within the range of from about 50% to about 70% to a V.M. content within the range of from about 20% to about 26% by suspending said extrudate in a stream of high velocity moisture absorptive gases at a temperature of from about 225° F. to about 900° F. for about 2 to 4 seconds while simultaneously pulverizing said extrudate to a fineness such that substantially all particles are finer than 48 mesh and not more than about 50% by weight are finer than 325 mesh.

References Cited in the file of this patent

UNITED STATES PATENTS

| | | |
|---|---|---|
| 2,231,328 | Fitzsimons | Feb. 11, 1948 |
| 2,862,278 | Engel et al. | Dec. 2, 1958 |

OTHER REFERENCES

Beller: Article in Neftyanoe Khoz., vol. 26, No. 11, 1948, pages 31 to 36.

Butkevich et al.: Use of Shaft Mill for Joint Grinding and Drying of Clay, article in Chemical Abstracts, col. 14, 287, vol. 49, 1955.